INVENTOR.
DONALD H. BAKER
BY
ATTORNEY

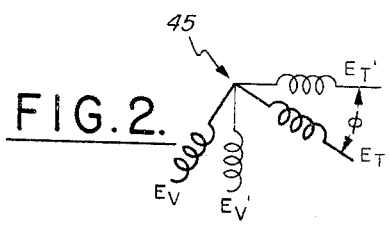
FIG.2.
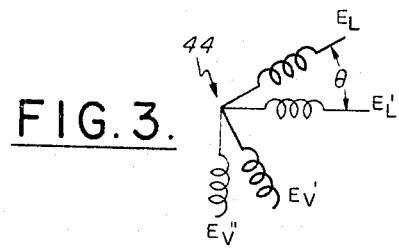
FIG.3.
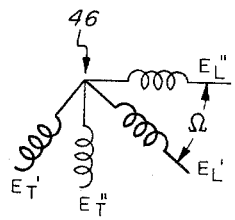
FIG.4.
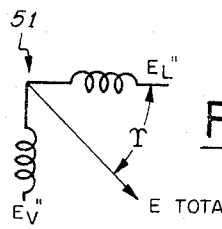
FIG.5.
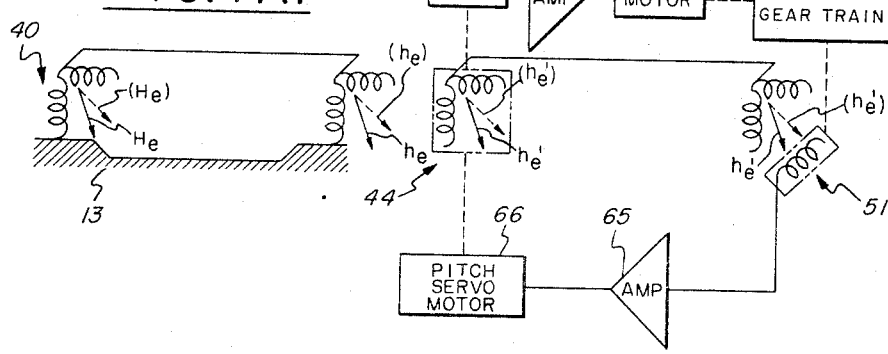
FIG.7A.
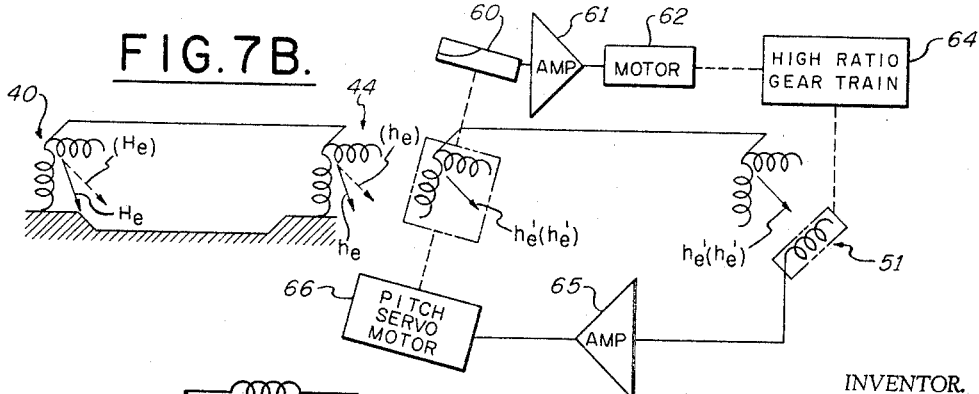
FIG.7B.
FIG.9.
INVENTOR.
DONALD H. BAKER
BY
ATTORNEY Oct. 4, 1966     D. H. BAKER     3,276,273
EARTH'S MAGNETIC FIELD RESPONSIVE APPARATUS
Filed June 25, 1962     3 Sheets-Sheet 3

United States Patent Office 3,276,273
Patented Oct. 4, 1966

3,276,273
EARTH'S MAGNETIC FIELD RESPONSIVE APPARATUS
Donald H. Baker, Phoenix, Ariz., assignor to Sperry Rand Corporation, Great Neck, N.Y., a corporation of Delaware
Filed June 25, 1962, Ser. No. 204,674
25 Claims. (Cl. 74—5.47)

This invention relates to systems which are responsive to the earth's magnetic field. The invention is applicable to apparatus for navigable craft which provides attitude information about three orthogonally disposed axes of the craft at all attitudes of the craft. The invention is also applicable to gyro stabilized platforms or reference devices.

Previous reference devices for providing attitude information about three orthogonally disposed axes of a navigable craft usually require a plurality of gyroscopes. Each of the prior art gyroscopes is carefully oriented with respect to the other and precisely manufactured to have comparable characteristics. In spite of closely controlled manufacturing conditions, the characteristics of the gyros vary excessively with respect to each other. Further, undesirable interaction between the gyros is common. Still another disadvantage involves the excessive weight and space required by the prior art multiple gyro platforms. In addition, the prior art gyro stabilized platforms are extremely expensive and both the difficulty of manufacturing and the cost increase significantly when an all-attitude multiple gyro stabilized platform is required.

It is an object of the present invention to utilize a signal representative of the earth's total magnetic field as a reference.

It is another object of the present invention to provide a reference system which utilizes the earth's total magnetic field as a short-term reference.

It is another object of the present invention to provide a gyro stabilized platform which produces attitude information about three orthogonally disposed axes while utilizing only one gyroscope.

It is a further object of the present invention to provide a one gyro platform which produces both short and long term attitude information about three orthogonally disposed axes for all attitudes of the craft upon which the platform is mounted.

It is another object of the present invention to provide a reference device for navigable craft in which the earth's total magnetic field provides one short-term reference and a gyroscope provides another short-term reference.

It is a further object of the present invention to provide a reference device for navigable craft in which the earth's total magnetic field provides a short-term reference, a gyroscope provides an additional short-term reference and wherein gravity responsive means together with magnetic field responsive means provides long term references.

These and other objects are accomplished by a one gyro platform reference system which may consist of a fixed axis flux valve, a directional gyro suspended in servoed pitch and roll gimbals, an earth field servo and a heading follow-up servo. The fixed axis flux valve detects the total earth's field in terms of three voltages proportional to earth field components along the longitudinal, transverse and vertical axes of the craft on which it is mounted. These signals are resolved into horizontal and vertical components by resolvers on the pitch and roll gimbals and in the heading follow-up servo. These signals are applied to a resolver in the earth field servo where they are combined into a total field signal which is used to sense rotations of the craft about an east-west axis, for example, with the gyro slaved to an east-west position. The gyro spin axis, which is leveled by a signal from a liquid level, is used to generate heading and sense rotation about a north-south axis. The rotations sensed by the earth field servo and the directional gyro are resolved into pitch and roll error signals in the heading follow-up servo and are used to drive the pitch and roll servoed gimbals. By utilizing this arrangement, pickoffs suitably disposed on the platform provide signals representative of the roll, pitch and heading of the craft upon which the platform is mounted for all attitudes of the craft.

Referring to the drawings,

FIG. 2 is a schematic diagram of the roll resolver 45 of FIG. 1 with the stator windings in heavy lines and the rotor windings in light lines.

Figure 1:
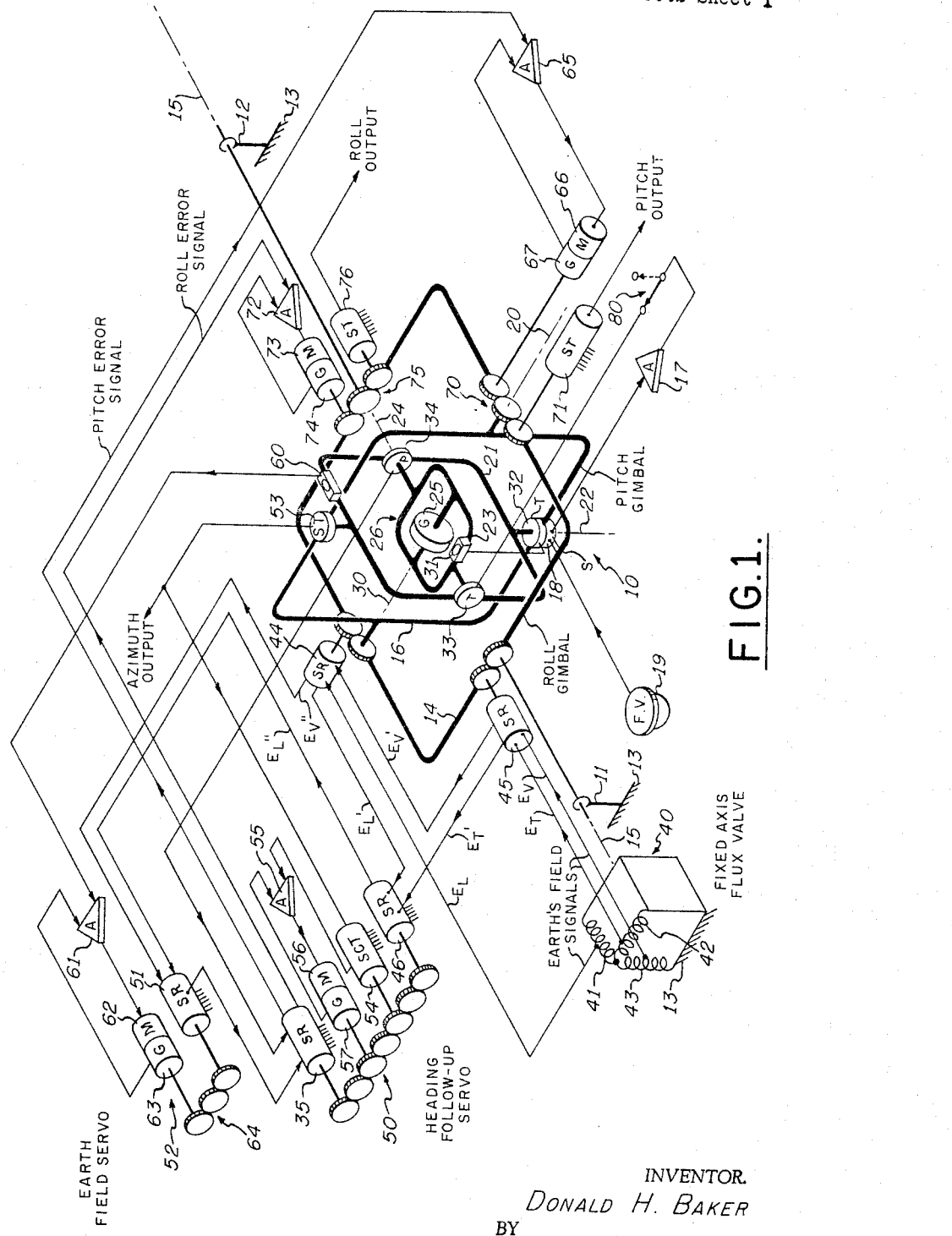
FIG. 1 is a schematic diagram of the present invention as applied to a one gyro platform reference system for aircraft.
Figure 6A:
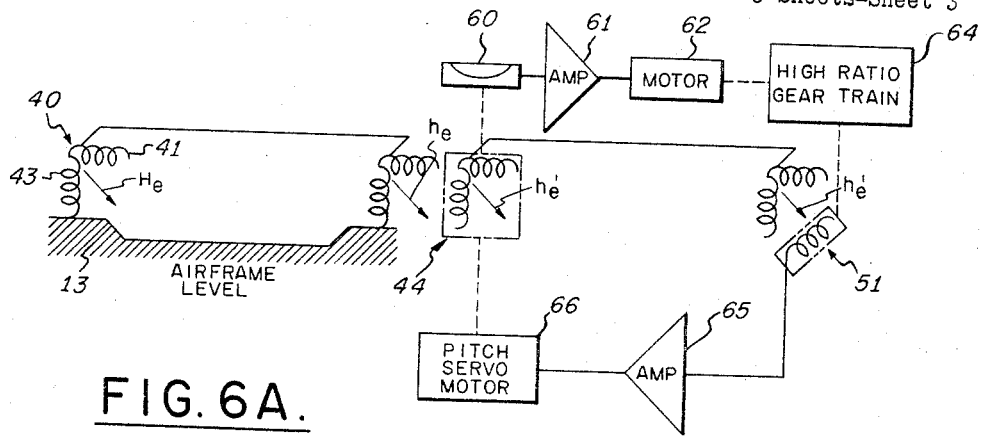
Figure 8:
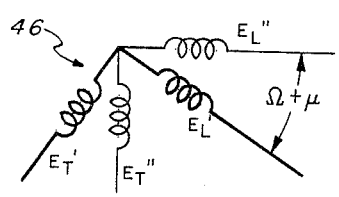

FIG. 3 is a schematic diagram of the pitch resolver 44 of FIG. 1 with the windings shown as in FIG. 2, FIG. 4 is a schematic diagram of the heading follow-up resolver 46 of FIG. 1 with the windings shown as in FIG. 2, FIG. 5 is a schematic diagram of the stator windings of the earth field resolver 51 of FIG. 1, FIGS. 6A, B and C are schematic diagrams to explain the operation of earth field leveling, FIGS. 7A and B are schematic diagrams to show drift correction, FIG. 8 is a schematic diagram of the resolver 46 with the windings shown as in FIG. 2, and FIG. 9 is a schematic diagram of the stator windings of the earth field resolver 51.

Referring now to FIG. 1, a one gyro stable platform 10 is mounted for rotation on spaced posts 11 and 12 which may represent a housing fixed to an airframe 13. The roll gimbal 14 of the platform 10 is mounted by trunnion bearing connections on posts 11 and 12 to pivot around an axis 15 that is coincident with the fore and aft axis of the aircraft about which the aircraft rolls.

A pitch gimbal 16 is mounted on the roll gimbal 14 by means of trunnion bearing connections to pivot around an axis 20. The axis 20 is perpendicular to the axis 15 and is normally parallel with the athwartship or transverse axis of the craft about which the aircraft pitches. A vertical gimbal 21 is pivoted in trunnion bearing connections on the pitch gimbal 16 for rotation about an axis 22 that is perpendicular to the axis 20. The axis 22 is normally both vertical and parallel to the vertical axis of the craft about which the aircraft yaws. A horizontal gimbal 23 is mounted by trunnion bearing connections on the vertical gimbal 21 to rotate about an axis 24 that is perpendicular to the axis 22 and which is shown for convenience to be coincident with the axis 15. The rotor 25 of a directional gyroscope 26 is mounted for rotation by trunnion bearing connections on the horizontal gimbal 23 to spin about a normally horizontal axis 30 that is perpendicular to the axis 24. For convenience of explanation, the axis 30 is shown coincident with the axis 20. The directional gyroscope 26 may be of the type described in U.S. Patent 2,970,480 issued February 7, 1961 to E. L. Zeigler, et al. entitled, "Anti-Friction Support Mechanism for Gyroscopic Devices."

A liquid level 31 is mounted on the horizontal gimbal 23 to be responsive in the condition shown to the tilt of the spin axis 30 from the horizontal due to inherent drift of the gyro 26 in the vertical plane perpendicular to the roll axis 15. The liquid level 31 is connected to provide a signal indicative of tilt to a torque motor 32 which has its stator mounted on the gimbal 16 and its armature connected to the vertical trunnion of the gimbal 21 to provide a torque about the axis 22 to precess the rotor 25 to maintain the spin axis 30 in a horizontal condition.

The liquid level 31 provides a long term reference signal as a function of roll and/or pitch depending upon the orientation of the craft in a manner to be more fully explained.

A torque motor 33 is mounted on the gimbal 21 and is responsive to slaving signals from a slaving amplifier 17. The slaving amplifier 17 is responsive to a heading error signal from a flux valve synchro 18 that is representative of the difference between the reference direction provided by the directional gyroscope 26 and the magnetic reference direction provided by a pendulous detector or flux valve 19. The flux valve 19 provides a long term reference signal representative of the direction of the horizontal component of the earth's magnetic field to compensate for the inherent long term azimuthal drift of the gyro 26. The synchro 18 has its rotor connected to the vertical trunnion of the gimbal 21. The amplified error signal from the slaving amplifier 17 provides a torque about the axis 24 to precess the rotor 25 to maintain its spin axis 30 in a predetermined orientation, for example east-west, for reasons to be explained. The system which slaves the directional gyroscope 26 to maintain its spin axis 30 in a predetermined orientation may be of the type disclosed in U.S. Patent 2,998,727 issued September 5, 1961 to the present inventor and entitled "Heading Reference System for Navigable Craft," or it may be of the type disclosed in U.S. Patent 2,808,656 issued October 8, 1957 to A. D. Pirone entitled, "Gyromagnetic Reference Systems," or one of the other systems recited in U.S. Patent 2,998,727.

To provide a signal proportional to the lack of perpendicularity of the vertical gimbal 21 with respect to the horizontal gimbal 23, a pickoff 34 has its stator connected to the gimbal 21 and its armature rotated with the gimbal 23. The signal from the pickoff 34 provides a short-term reference as a function of roll and/or pitch and a long term reference as a function of the signal from the liquid level 31 both depending upon the azimuthal orientation of the craft in a manner to be more fully explained. The signal from the pickoff 34 is connected to one input terminal of a resolver 35. The resolver 35 may be of the type described in U.S. Patent 2,591,697 of Hayes, Jr., entitled, "Stable Reference Apparatus" issued April 8, 1952.

A fixed axis flux valve or magnetic field detector 40 consists of magnetometer elements 41, 42 and 43 that are arranged mutually perpendicular with respect to each other, the combination of which is fixed to the airframe 13 and disposed to be responsive to the components of the earth's total magnetic field and to provide signals representative thereof in a manner to be described. The flux valve or detector 40 may be of the type disclosed in said U.S. Patent 2,998,727. The elements 41, 42 and 43 are shown as representing the output windings thereof for purposes of simplicity. The elements 41, 42 and 43 are disposed parallel to the longitudinal, transverse and vertical axes 15, 20 and 22 respectively.

As more fully explained in the aforementioned patent, 2,998,727, each of the elements 41, 42 and 43 produces a voltage of given amplitude depending upon its position relative to the earth's total magnetic field; thus the signals therefrom depend upon the strength of the earth's total magnetic field, the aircraft heading and the attitude of the aircraft, which for purposes of the present invention, must be resolved to provide a vector representative of the earth's total magnetic field with respect to earth coordinates. Thus the element 41 is connected to one stator winding of a pitch resolver 44 and the elements 42 and 43 are connected to respective stator windings of a roll resolver 45.

The rotor windings of the roll resolver 45 are rotated in accordance with the roll angle of the aircraft. One rotor winding of the roll resolver 45 is connected to provide a resolved vertical magnetic field component signal to one stator winding of the pitch resolver 44. The other rotor winding of the roll resolver 45 is connected to provide a resolved transverse magnetic field component signal to a stator winding of a horizontal earth field resolver 46 of a heading follow-up servo 50. The pitch resolver 44 has its rotor windings rotated in accordance with the pitch angle of the aircraft. One of its rotor windings is connected to provide a signal representative of the vertical component of the earth's field to one stator winding of a total field resolver 51 of an earth field servo 52. The other rotor winding of the pitch resolver 44 is connected to the other stator winding of the resolver 46. The rotor winding of the resolver 46 provides a signal in accordance with the horizontal earth field to the other stator winding of the total field resolver 51.

A synchro transmitter 53 having its stator mounted on the gimbal 16 and its rotor connected to the vertical trunnion of the gimbal 21 provides a heading follow-up signal to the stator of a synchro control transformer 54 of a heading follow-up servo 50. The output signal from the rotor of the control transformer 54 is amplified in amplifier 55 to drive a servomotor 56 in a direction and through an angle depending upon the phase and amplitude of the heading follow-up deviation signal. The output shaft of the motor 56 is connected to drive a feedback tachometer generator 57, the rotor of the control transformer 54, the rotor of the synchro resolver 46 and the rotor of the resolver 35 and may also provide an output shaft rotation in accordance with the heading of the aircraft.

A gravity vertical responsive device in the form of a liquid level 60 is mounted on the gimbal 21 to sense the level of the axis 24 at right angles to the gyro spin axis 30. The signal from the liquid level 60 provides a long term reference to compensate for the long term drift of the gyro platform 10 as a function of pitch and/or roll depending upon the azimuthal orientation of the craft in a manner to be more fully explained. The signal from the liquid level 60 is connected to an amlifier 61 in the earth field servo 52 where it is amplified to drive a servo motor 62 in a direction and through an angle depending upon the phase and duration of the signal from the liquid level 60. The output shaft of the motor 62 is connected to drive a feedback tachometer generator 63 and through a high ratio gear train 64, the rotor of the resolver 51. The rotor of the resolver 51 is connected to the other stator winding of the resolver 35.

One rotor winding of the resolver 35 provides a pitch error signal to a phase sensitive amplifier 65 which amplifies the pitch error signal to drive a pitch servomotor 66. The motor 66 has its output shaft connected to drive a feedback tachometer generator 67. The motor 66 also drives through gearing 70 to maintain the pitch gimbal 16 perpendicular to the horizontal plane containing the gimbal 23 thereby maintaining the pitch gimbal 16 vertical. The rotor of a synchro transmitter 71 is also driven by the motor 66 to provide an output representative of the true pitch of the aircraft.

The other rotor winding of the resolver 35 provides a roll error signal to a phase sensitive amplifier 72 which amplifies the roll error signal to drive a roll servomotor 73. The motor 73 has its output shaft connected to drive a feedback tachometer generator 74. The motor 73 also drives through gearing 75 to maintain the roll gimbal 14 in a horizontal plane containing the gimbal 23 thereby maintaining the roll gimbal 14 horizontal. The rotor of a synchro transmitter 76 is also driven by the motor 73 to provide an output representative of the true roll of the aircraft.

In the operation of the present invention, the directional gyroscope 26 is slaved by the signal from the slaving amplifier 17 to maintain its spin axis 30 oriented, for example, east-west by means of a system disclosed in said U.S. Patents 2,998,727; 2,808,656 or other suitable system. The fixed axis flux valve 40 senses the components of the earth's total magnetic field. The output voltages of the three elements 41, 42 and 43 of the flux valve 40 are proportional to the following:

$$E_L = (HE)_i \cos \Omega \cos \theta - (HE)_k \sin \theta \quad (1)$$

$$E_T = (HE)_i (\cos \Omega \sin \theta \sin \phi - \sin \Omega \cos \phi) + (HE)_k \cos \theta \cos \phi \quad (2)$$

$$E_V = (HE)_i \cos \Omega \sin \theta \cos \phi + \sin \Omega \sin \phi) + (HE)_k \cos \theta \cos \phi \quad (3)$$

where:
$E_L$, $E_T$, $E_V$ are the longitudinal, transverse and vertical voltages respectively from the fixed axis detector 40,
$(HE)_i$, $(HE)_k$ are the horizontal and vertical components respectively of the earth's magnetic field,
$\Omega$ is the magnetic heading of the aircraft,
$\theta$ is the aircraft pitch angle, and
$\phi$ is the aircraft roll angle.

In the embodiment shown in FIG. 1, the signals from the flux valve 40 are resolved into horizontal and vertical components of the earth's field by means of resolvers 44, 45 and 46 and these signals are combined in the resolver 51 to provide a signal representative of the earth's total magnetic field all in a manner to be fully explained. To simplify the equations given below, all resolved coupling coefficients are assumed to be unity. If the actual condition is otherwise, conventional compensation techniques may be utilized. The signals $E_T$ and $E_V$ from Equations 2 and 3 above are fed to the roll resolver 45 where they are resolved as shown in FIG. 2 to provide:

$$E_T' = E_T \cos \phi - E_V \sin \phi \quad (4)$$

$$E_V' = E_T \sin \phi + E_V \cos \phi \quad (5)$$

Inserting the values of $E_T$ and $E_V$ from Equations 2 and 3 yields:

$$E_T' = -(HE)_i \sin \Omega \quad (6)$$

$$E_V' = (HE)_i \cos \Omega \sin \theta + (HE)_k \cos \theta \quad (7)$$

Then $E_L$ and $E_V'$ ar fed to the pitch resolver 44 where they are resolved as in FIGURE 3 to provide:

$$E_L' = E_L \cos \theta + E_V' \sin \theta \quad (8)$$

$$E_V'' = -E_L \sin \theta = E_V' \cos \theta \quad (9)$$

Substituting the values of $E_L$ and $E_V'$ from Equations 1 and 7 yields:

$$E_L' = (HE)_i \cos \Omega \quad (10)$$

$$E_V'' = (HE)_k \quad (11)$$

$E_L'$ and $E_T'$ are then fed to the resolver 46 on the heading follow-up servo 50 where they are resolved as in FIG. 4 to provide:

$$E_L'' = E_L' \cos \Omega - E_T' \sin \Omega \quad (12)$$

$$E_T'' = E_L' \sin \Omega + E_T' \cos \Omega \quad (13)$$

Then, substituting the values of $E_L'$ and $E_T'$ from Equations 6 and 10 yields:

$$E_L'' = (HE)_i \quad (14)$$

$$E_T'' = 0 \quad (15)$$

The signals $E_L''$ and $E_V''$ are fed to the resolver 51 on the earth field servo 52 where they combine to form the total field as in FIG. 5 where $\gamma$ is the dip angle (by definition) the magnitude of the earth's total magnetic field $H_e$ is then $$|E \text{ total}| = [|E_T''|^2 + |E_V''|^2]^{1/2} = H_e \quad (16)$$

Thus, with the roll and pitch servoed gimbals 14 and 16 respectively and the heading followup servo 50 following properly, the earth's total magnetic field signal $H_e$ in the stator of the resolver 51 is insensitive to heading, pitch and roll of the aircraft. Therefore, the earth's total magnetic field vector in the resolver 51 provides a short term reference signal fixed with respect to earth coordinates by means of which pitch and/or roll of the craft may be measured depending upon the azimuthal orientation of the craft in a manner to be more fully explained.

FIGS. 6A, B and C are simplified schematics to explain the operation of the earth field leveling. As explained above, the earth's total magnetic field $H_e$ is sensed by the fixed axis flux valve 40. In FIG. 6, the field is sensed by the longitudinal and vertical coils 41 and 43 respectively which are the coils that change orientation with respect to the earth's field when the aircraft maneuvers in pitch. The earth's field is reproduced as an A.C. field $h_e$ in the resolver 44 on the pitch gimbal 16. As shown in FIG. 6A, the stator of the resolver 44 is effectively tied to the airframe 13. Thus, if the direction of the earth's field changes with respect to the fixed axis flux valve 40, it will change a like amount with respect to the stator of the resolver 44. The rotor of the resolver 44 is driven by the pitch servo motor 66 and consequently the resultant angle between the stator and rotor of the resolver 44 is the pitch angle or the angle between the pitch and roll servoed gimbals 16 and 14 respectively, as shown in FIG. 1. The A.C. field in the rotor is then $h_e'$ which is transmitted to the stator of the resolver 51 of the earth field servo 52. The signal induced in the rotor of the resolver 51 is then transmitted to the pitch servo motor 66 which drives the pitch gimbal 16.

Driving the pitch gimbal 16 also drives the liquid level 60 on the gimbal 21. In the configuration shown in FIG. 1, the liquid level 60 senses level in pitch. The liquid level 60 produces a signal which energizes the servomotor 62 to drive the rotor of the resolver 51 on the earth field servo 52 at a slow rate due to the high ratio gear train 64. The gear train 64 limits the rate at which the rotor can be driven to about three degrees a minute, for example, with respect to the resolver case. This rate is analogous to the rate at which the gyro rotor 25 is leveled. This generates a signal on the rotor of the resolver 51 which causes the pitch servo motor 66 to follow up. An equilibrium condition is reached when the rotor of the resolver 51 is at null, i.e. at right angles to the field, with the liquid level 60 also nulled, i.e. level. Reaching this equilibrium position constitutes the initial erection of the platform 10 and is shown in FIG. 6A.

Figure 6B:
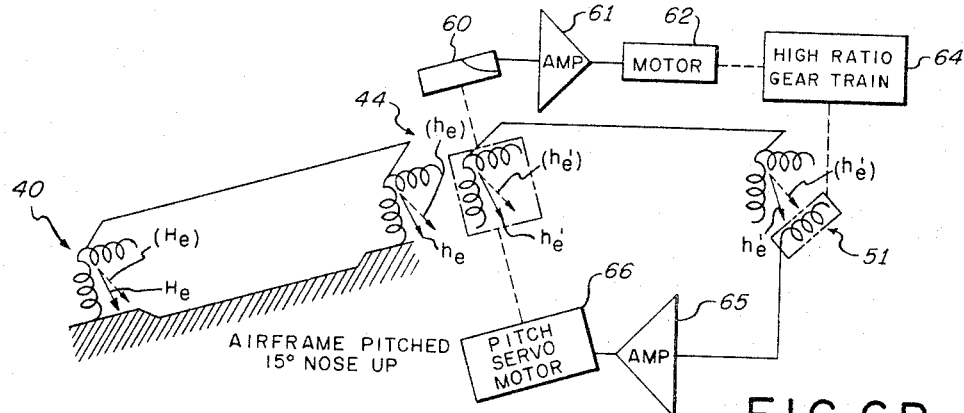

When the aircraft maneuvers, any lag in the pitch and roll servoes will cause the field in the earth field resolver 51 to rotate with respect to the case. The rotor of the resolver 51 will no longer be at null and consequently an error signal will be developed. This error signal then drives the pitch and roll servoes to follow up the aircraft's motion. With the platform 10 oriented as shown in FIG. 1, the liquid level 60 senses pitch and FIG. 6B shows the effect of a pitch change prior to any of the servomotors driving to illustrate the generation of an error signal. When the aircraft pitches up, the position of the earth's field changes with respect to the sensing coils 41 and 43 as shown by comparing the new position $H_e$ with the previous position shown by $(H_e)$. This field is also transmitted to the stator of the resolver 44 on the pitch gimbal as before where it makes the same angle with respect to the resolver stator windings as the earth field made with respect to the detector coils 41 and 43. The rotor of the resolver 44 is shown rotated with the aircraft (since the servomotor 66 has not yet driven) and consequently the field transmitted to the earth field servo resolver 51 will show the same rotation as indicated by the field $h_e'$ compared to its position before the rotation ($h_e'$). The rotor of the resolver 51 is then no longer at null since it is no longer at right angles to the field in the stator of the resolver 51 and an error signal is generated which energizes the pitch servomotor 66 and causes it to drive until a null is reached. A signal is also generated by the liquid level 60 which drives the rotor of the resolver 51. However, this can only be driven at a slow rate (i.e., 3 degrees/minute or so) and, consequently the rapid response of the pitch servomotor 66 which is driven at aircraft rates far overshadows the effect of the signal from the liquid level 60.

Figure 6C:
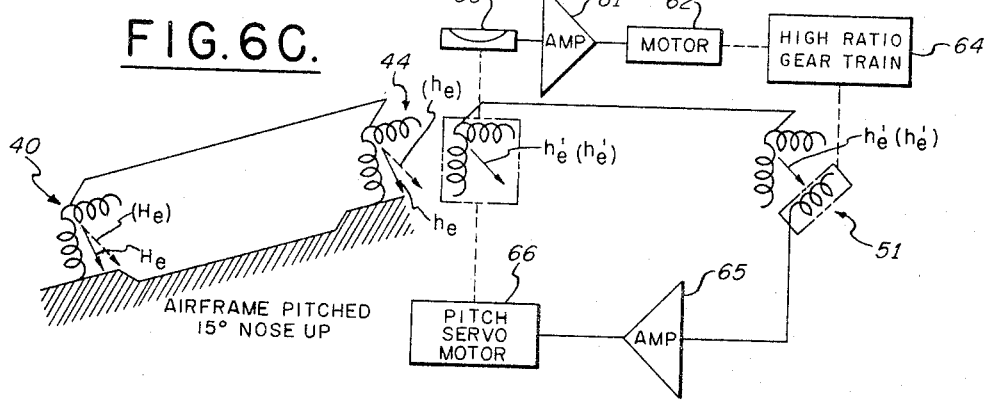

The pitch servomotor 66 will drive until the condition shown in FIG. 6C is reached. Here the field as sensed by the fixed axis detector 40 and the field generated by it in the stator of the resolver 44 are identical to the previous figure. However, the pitch gimbal 16 has been driven until the rotor of the pitch resolver 44 has been turned to rotate the field transmitted to the resolver 51 on the earth field servo 52 until it is at right angles to the rotor. In other words, the field $h_e'$ in the pitch resolver rotor makes the same angle to the field as when the system was level. Therefore, the field in the earth field resolver 51 will make the same angle with respect to the resolver windings as it did when the aircraft was level. This then places the rotor in the earth field resolver 51 at a null position. The liquid level 60 has also been re-oriented to level, and consequently, it no longer is trying to drive the earth field resolver rotor. The equilibrium position for this pitch up maneuver is reached when the pitch servomotor 66 has driven the pitch gimbal 16 to the vertical position as shown. Since the rates at which the pitch gimbal 16 can be driven are at least as fast as the rate at which the plane can pitch up, and since the amplifier 65 which drives the pitch servomotor 66 can be made to respond to a very small error signal in the earth field resolver 51, the pitch gimbal 16 maintains very good verticality during aircraft maneuvers.

While this simplified illustration deals with the sensing of pitch by the earth field circuit, it will be realized that in practice as the aircraft moves to different headings the roles of the gyro 26 and the earth field servo 52 vary. For example, a ninety degree rotation from the orientation shown in FIG. 1 will place the components in a position where the gyro pickoff 34 senses pitch and the earth field servo 52 senses roll. Thus, it is desirable to resolve the earth field error signal in conjunction with the signal from the gyro pickoff 34 with heading to provide pitch and roll error signals. The signal from the pickoff 34 provides an axis of stabilization at right angles to that provided by earth's total magnetic field vector signal in the earth field resolver 51. By slaving the gyro 26 to an east-west orientation, the spin axis 30 of the gyro 26 is always at right angles to the earth's field vector. Thus, the gyro 26 and the earth field resolver 51 always provide error signals measured about orthogonal axes thereby providing proper servo operation.

It is also desirable to maintain the sensing plane of the earth field servo 52 at right angles to the gyro's spin axis 30. This is accomplished by resolving the earth field with heading prior to transmitting it to the earth field servo 52. This resolver 46 is located on the heading follow up servo 50. The drift of the gyro 26 and the earth's field are continually corrected by the operation of the liquid levels 31 and 60. Earth field "drift" is due to motion of the aircraft over the surface of the earth and diurnal variations. As latitude is changed, the dip angle changes from zero at the magnetic equator to 90 degrees at the poles. The rate of change has a maximum of 36 degrees per hour at 900 knots, for example. This drift rate is similar to the rate of the directional gyro rotor 25 in drifting out of level. The liquid levels 31 and 60 correct for the drifts by slaving the level-torque 32 and driving the rotor of the earth field resolver 51 respectively.

FIGS. 7A and B show the effect of changes in the earth field due to aircraft motion over the earth's surface. FIG. 7A shows the condition before the drift error is corrected. The field $H_e$ has rotated with respect to its original position ($H_e$). Thus the transmitted heading $h_e$ and $h_e'$ are rotated and the rotor of the earth field resolver 51 is no longer at null. An error signal is generated which will drive the pitch servomotor 66. It should be noted that the liquid level 60 is at null in this figure since the change is one of field direction not of verticality of the pitch gimbal 16 as in the previous example. The immediate result of this change will be for the pitch gimbal 16 to drive to a new position which nulls the rotor of the earth field resolver 51, as shown in FIG. 7B. Here the rotor of the pitch resolver 44 has rotated until the field in the earth field resolver 51 is again at right angles to the rotor. This driving of the pitch servomotor 66 has, however, unleveled the liquid level 60 and it now generates a signal which drives the rotor of the resolver 51 on the earth field servo 52 at a slow rate. Driving this rotor moves it out of null which in turn drives the pitch servomotor 66 which rotates the resolved field to renull the earth field resolver 51. This also drives the pitch gimbal 16 thereby positioning the liquid level 60 toward the level position. Equilibrium is reached when the liquid level 60 is level and the resolver rotor is at null.

This results in a pitch and roll stabilized one gyro platform 10 which provides pitch, roll and azimuth output signals as indicated by the respective legends for all attitudes of the aircraft.

It will be appreciated that the fixed axis flux valve 40 which is described above as detecting the components of the total earth field may also be used to generate heading information to slave the gyro 26 as described in said U.S. Patent 2,998,727. However, it is usually preferable to use two separate flux valves because if a fixed axis flux valve such as 40 is used for vertical stability only, and a conventional pendulous flux valve such as 19 is used for heading, they can then be separately compensated more readily. A number of applicable compensation techniques are disclosed in said U.S. Patent 2,998,727.

In the above explanation, the spin axis 30 of the directional gyroscope 26 has been described as slaved east-west for purposes of simplicity by means of a signal from the slaving amplifier 17. Actually a considerable deviation of the spin axis 30 from an east-west orientation can be tolerated and is normally the case in a free directional gyro mode of operation. In a free directional gyro mode, a switch 80 is open as shown in dotted lines thereby disconnecting the slaving amplifier 17 from the torque motor 33. In this mode, the spin axis 30 can make any angle with respect to the earth's field. While arbitrary, this angle is reasonably constant varying only due to gyro drift and meridian convergence effects. If the angle that the spin axis 30 makes to the magnetic east-west direction is $\mu$, then the outputs of the resolver 46 are as follows with reference to FIG. 8:

$$E_L'' = E_L' \cos(\Omega + \mu) - E_T' \sin(\Omega + \mu) \quad (17)$$
$$E_T'' = E_L' \sin(\Omega + \mu) + E_T' \cos(\Omega + \mu) \quad (18)$$

Substituting the values of $E_L'$ and $E_T'$ from Equations 6 and 10 yields:

$$E_L'' = (HE)_i \cos \mu \quad (19)$$
$$E_T'' = -(HE)_i \sin \mu \quad (20)$$

Now when $E_L''$ and $E_V''$ are combined in the earth field resolver 52 as shown in FIG. 9, the following results:

$$\tan \Upsilon' = E_L'' / E_V'' \quad (21)$$
$$(E \text{ total}) = [(E_L'')^2 + (E_V'')^2]^{1/2} \quad (22)$$

Substituting from Equations 11 and 20 yields:

$$\tan \Upsilon' = \tan \Upsilon \cos \mu$$
$$E \text{ total} = [(HE)_i^2 \cos^2 \mu + (HE)_k^2]^{1/2}$$

It should be noted that the direction the field makes with respect to the stator of the resolver 52 is still not a function of heading, pitch and roll. Thus, the signal in the resolver 52 can be used to level the platform 10 as long as the field is not zero. Looking at the magnitude equation it can be seen that the field will be zero only if the spin axis 30 is north-south ($\mu = 90°$) and the vertical field $(HE)_k$ is zero. This condition can only occur at the magnetic equator.

For practical purposes, the combination of conditions which can cause lack of stability can never occur during operation. Normally an automatic fast synchronization circuit is used when the system is initially activated to rapidly orient the spin axis 30 east-west to provide an initial optimum spin axis orientation, i.e. $\mu$ equal zero degrees. If during free directional gyro operation, the spin axis 30 drifts 60 degrees ($\mu=60$); half of the earth's field will be sensed by the earth field resolver 52 and stabilization will be satisfactory. It is inconceivable that an aircraft could fly for a long enough period of time at or near the magnetic equator to permit the small amount of magnetic meridian convergence in this region to combine with the gyro's drift rate to produce a 60 degree drift of the directional gyro 26. Even if this did occur, the pilot need only recycle the fast synchronization circuit to realign the system.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. In a reference system for movable craft, the combination comprising
   (1) first means for providing a first signal representative of short-term deviations in the attitude of the craft from a predetermined attitude about a first axis thereof,
   (2) means for providing a second signal representative of the direction of the total magnetic field of the earth with respect to earth axes,
   (3) and means coupled with said first means and responsive to said second signal for providing third and fourth signals representative of short-term deviations in the attitude of the aircraft from a predetermined attitude about a second and third axis thereof.

2. In a reference system as set forth in claim 1 wherein said first means includes gyroscopic means.

3. In a reference system as set forth in claim 2 further including
   (1) gravity responsive means for providing signals in accordance with long-term deviations of said gyroscopic means from the gravity vertical,
   (2) and means responsive to said long-term deviation signals for modifying said third and fourth signals in accordance with any output therefrom.

4. In a reference system as set forth in claim 3 wherein said gyroscopic means comprises a directional gyroscope and further including
   (1) means responsive to the horizontal components only of said total magnetic field for providing a signal in accordance with long-term deviations of said directional gyroscope from a predetermined magnetic azimuthal deviation,
   (2) and means for modifying said first signal in accordance therewith.

5. In a reference system for navigable craft, the combination comprising,
   (1) first means for providing first and second signals representative of short-term deviations in the attitude of the craft from a predetermined attitude about two mutually perpendicular axes thereof,
   (2) second means for providing a third signal representative of the direction of the total magnetic field of the earth with respect to earth axes,
   (3) and means coupled with said first means and responsive to said third signal for providing a fourth signal representative of short-term deviations in the attitude of the aircraft from a predetermined attitude about a third axis thereof mutually perpendicular to said two axes.

6. In a reference system as set forth in claim 5 wherein said first means includes a directional gyroscope, wherein said first and second signals represent short-term departures in the attitude of the craft about the vertical axis and one horizontal axis of the craft, and wherein said fourth signal represents short-term departures in the attitude of the craft from a predetermined attitude about the other of said horizontal craft axes.

7. In a reference system for movable craft,
   (1) first means including detecting means responsive to the earth's total magnetic field for providing a first reference signal representative of the earth's total magnetic field,
   (2) second means for providing a second reference signal,
   (3) and third means associated with said first and second means for providing a third reference signal,
   (4) said first, second and third means being so constructed and arranged that said first, second and third reference signals provide output signals representative of attitude information about three perpendicular axes of said craft for all attitudes of said craft.

8. In a reference system as described in claim 7 wherein said second means includes gyroscopic means.

9. In a reference system for movable craft,
   (1) detecting means mounted on said craft for providing first signals representative of the components of the earth's total magnetic field with respect to the coordinates of said craft,
   (2) gyroscopic means for providing a reference signal representative of the direction of the spin axis of said gyroscopic means,
   (3) gravity responsive means associated with said gyroscopic means for providing a gravity vertical signal, and
   (4) resolving means associated with said gyroscopic means and responsive to said gravity vertical signal and said first signals for providing a reference signal representative of the earth's total magnetic field with respect to the earth's coordinates.

10. In a reference system for navigable craft,
    (1) first detecting means mounted on said craft for producing first signals representative of the components of the earth's total magnetic field with respect to craft coordinates,
    (2) gyroscopic platform means including a directional gyroscope having a horizontal spin axis,
    (3) resolving means coupled with said gyroscopic platform means responsive to said first signals for providing a short-term reference signal representative of the earth's total magnetic field with respect to the earth's corrdinates and for providing further signals representative of short term pitch and roll attitude error,
    (4) positioning means responsive to said pitch and roll error signals for positioning said gyroscopic platform means in accordance therewith,
    (5) gravity responsive means coupled with said platform and said resolving means for providing long-term vertical reference signals,
    (6) and pick-off means coupled with said gyroscopic platform means for providing signals representative of both long and short term pitch and roll attitude and short term azimuth attitude of said craft.

11. In a reference system as set forth in claim 10 further including
    (1) means responsive to the horizontal components only of said total magnetic field for providing a signal in accordance with long-term deviations of said directional gyroscope from a predetermined magnetic azimuthal deviation,
    (2) and means for modifying said short-term azimuth attitude signal in accordance therewith.

12. Gyroscopic apparatus for providing a short-term attitude reference about the vertical, roll and pitch axes of a vehicle comprising
    (1) a directional gyroscope having a rotor adapted to spin about a normally horizontal axis and first gimbal means for universally supporting said rotor for freedom about a first normally horizontal axis at right angles to said spin axis and a normally vertical axis, (2) second gimbal means for universally supporting said directional gyroscope in said vehicle for freedom about the roll and pitch axes of said vehicle, (3) means for sensing the components of the earth's total magnetic field with respect to said vehicle axes and including means coupled with said first and second gimbal means for providing a measure in accordance with the direction of the total magnetic field of the earth with respect to the earth, (4) means for generating measures in accordance with deviations in the roll and pitch attitude of the vehicle with respect to the direction of said total magnetic field, (5) and means responsive to said measures for positioning said second gimbal means in accordance therewith.

13. The apparatus set forth in claim 12 further including (1) gravity responsive means coupled with said directional gyroscope for supplying signals in accordance with long-term deviations in the position of said first gimbal means from gravity vertical, (2) and means for modifying the direction of said total earth's field in accordance therewith whereby said apparatus provides both a long term and short term attitude reference for said vehicle about its roll and pitch axes.

14. The apparatus set forth in claim 13 further including (1) long-term reference means responsive to the horizontal components only of the earth's magnetic field, (2) means responsive to said horizontal components for slaving said directional gyroscope to a predetermined azimuthal orientation, and (3) means responsive to long-term deviations in the orientation of said directional gyroscope from said predetermined orientation for further modifying the direction of said total magnetic field measure whereby said apparatus provides both long and short term attitude reference for said vehicle about its roll, pitch and vertical axes.

15. In a reference system for navigable craft having longitudinal, transverse and vertical axes, (1) detecting means mounted on said craft having three elements disposed mutually perpendicular to one another and parallel to the longitudinal, transverse and vertical axes respectively of said craft for producing first signals representative of the components of the earth's total magnetic field along said axes respectively, (2) gyroscopic platform means including a directional gyroscope universally supported by pitch and roll gimbals, said directional gyroscope having a horizontal spin axis oriented within an azimuth defining gimbal, (3) gravity responsive means mounted on said azimuth gimbal for providing a signal representative of the deviation thereof from the gravity vertical, (4) and resolving means coupled with said gyroscopic platform means and responsive to said first signals and said gravity vertical signal for providing a second signal repersentative of the direction of the earth's total magnetic field with respect to earth coordinates.

16. In a reference system for navigable craft, (1) detecting means responsive to the earth's total magnetic field for providing first signals representative of the orthogonally disposed components thereof with respect to the corresponding orthogonally disposed axes of said craft, (2) first resolving means responsive to said first signals for providing second signals representative of the orthogonally disposed components of the earth's total magnetic field with respect to earth coordinates, (3) and second resolving means responsive to said second signals for providing a third signal representative of the earth's total magnetic field with respect to earth coordinates.

17. In a system responsive to the earth's total magnetic field, (1) detecting means responsive to the earth's total magnetic field for providing a first signal, (2) means responsive to said first signal for providing a second signal representative of the earth's total magnetic field with respect to earth cordinates, (3) and signal utilization means responsive to said second signal.

18. In a system responsive to the earth's total magnetic field as recited in claim 17 wherein said signal utilization means further includes means so constructed and arranged that said second signal represents a short-term reference.

19. In a reference system for movable craft, (1) gyroscopic platform means including a directional gyroscope universally supported within pitch and roll gimbals, said directional gyroscope having a horizontal spin axis oriented within an azimuth defining gimbal, (2) pick-off means associated with said azimuth gimbal for providing a signal representative of the azimuth attitude of said craft, (3) gravity responsive means mounted on said azimuth gimbal for providing a signal representative of the deviation from the gravity vertical, (4) pick-off means coupled with said azimuth gimbal for providing a signal representative of the lack of perpendicularity between said azimuth gimbal and said gyro spin axis, (5) detecting means mounted on said craft for providing signals representative of the components of the earth's total magnetic field along the respective longitudinal, transverse and vertical axes of said craft, (6) first resolver means associated with said pitch and roll gimbals and responsive to said signals representative of the components of the earth's total magnetic field and said azimuth signal for providing signals representative of the components of the earth's total magnetic field with respect to earth coordinates, (7) second resolver means responsive to signals from said first resolver means, said lack of perpendicularity pick-off, said gravity responsive means and said azimuth signal for providing error signals representative of the deviation of said pitch and roll gimbals from a predetermined orientation, (8) and servo means responsive to said pitch and roll error signals for driving said pitch and roll gimbals to maintain said predetermined orientation.

20. In a reference system as recited in claim 19 further including means mounted on said gyroscopic platform means for providing signals representative of the pitch and roll attitude of said craft.

21. In a reference system recited in claim 19, wherein, (1) said second resolver means includes an earth field resolver having a stator and a rotor, said stator providing said signal representative of the earth's total magnetic field with respect to earth coordinates, (2) integrating means responsive to said gravity vertical signal for slowly driving said rotor in accordance with deviations from said gravity vertical, (3) and said servo means being so constructed and arranged to rapidly drive said pitch and roll gimbals in response to pitch and roll error signals respectively whereby said earth's total magnetic field signal acts as a short-term reference and said gravity vertical signal acts as a long-term reference.

22. In a reference system for movable craft, (1) gyroscopic platform means including a directional gyroscope universally supported within pitch and roll gimbals, said directional gyroscope having a horizontal spin axis and an azimuth defining gimbal rotatable about a normally vertical axis within said pitch and roll gimbals, (2) pick-off means associated with said azimuth gimbal for providing a signal representative tof the azimuth attitude of said craft, (3) gravity responsive means mounted on said azimuth gimbal for providing a signal representative of the deviation of said normally vertical axis from the gravity vertical, (4) pick-off means coupled with said azimuth gimbal for providing a signal representative of the lack of perpendicularity between said azimuth gimbal and said gyro spin axis, (5) detecting means mounted on said craft for providing signals representative of the components of the earth's total magnetic field along the respective longitudinal, transverse and vertical axes of said craft, (6) first resolver means associated with said pitch and roll gimbals and responsive to said signals representative of the components of the earth's total magnetic field and said azimuth signal for providing signals representative of the components of the earth's total magnetic field with respect to earth coordinates, (7) second resolver means responsive to the signals from the first resolver means and said gravity vertical signal for providing an output signal having short term components representative of the earth's total magnetic field with respect to earth coordinates and long term components representing deviations from gravity vertical, (8) third resolver means responsive to said output signal, said lack of perpendicularity signal and said azimuth signal for providing both long and short term pitch and roll error signals, (9) and servo means responsive to said pitch and roll error signals for driving said pitch and roll gimbals to maintain a predetermined orientation therebetween.

23. In a reference system recited in claim 22 further including pick-off means mounted on said gyroscopic means for providing signals representative of the pitch and roll of said craft for all attitudes of said craft.

24. In a reference system for navigable craft,
(1) detecting means responsive to the earth's total magnetic field for providing first signals representative of the orthogonally disposed components thereof with respect to the corresponding orthogonally disposed axes of said craft, (2) and means including resolving means responsive to said first signals for providing a second signal representative of the direction and magnitude of earth's total magnetic field with respect to earth coordinates, (3) said resolving means including a rotor responsive to said second signal for modifying said second signal in accordance with the position of said rotor.

25. In a reference system for navigable craft as recited in claim 24 wherein said second signal provides a short-term attitude reference and further including gravity responsive means for slowly positioning said rotor whereby to provide a long-term attitude reference.

References Cited by the Examiner

UNITED STATES PATENTS 2,835,131  5/1958  Vacquier et al. _____ 74—5 X
2,998,727  9/1961  Baker _____ 74—5.47 X FRED C. MATTERN, Jr., *Primary Examiner.*

BROUGHTON DURHAM, *Examiner.*

K. J. DOOD, *Assistant Examiner.*